Nov. 11, 1941.  M. E. ANDREWS ET AL  2,262,129
VEHICLE BODY COVER
Filed May 24, 1939  3 Sheets-Sheet 3
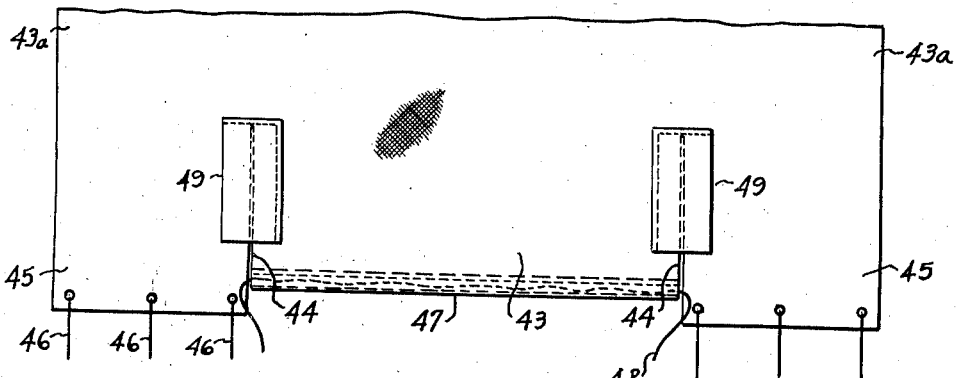
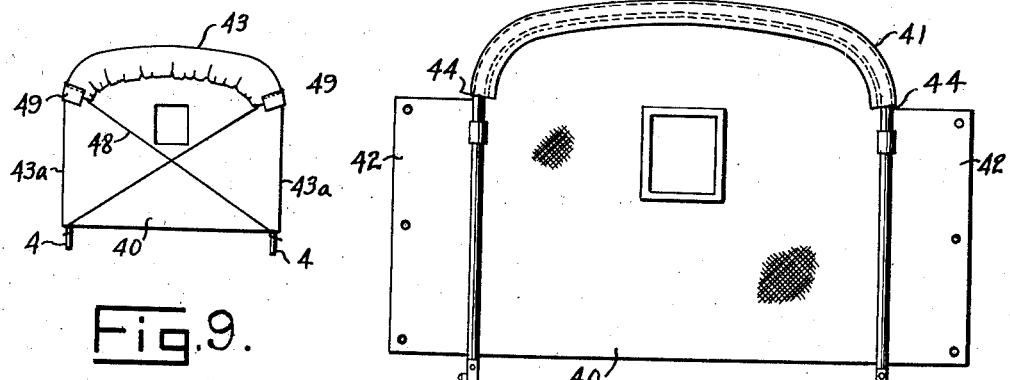
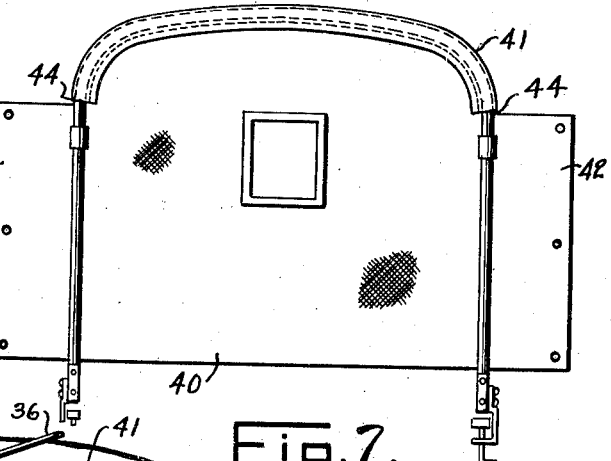
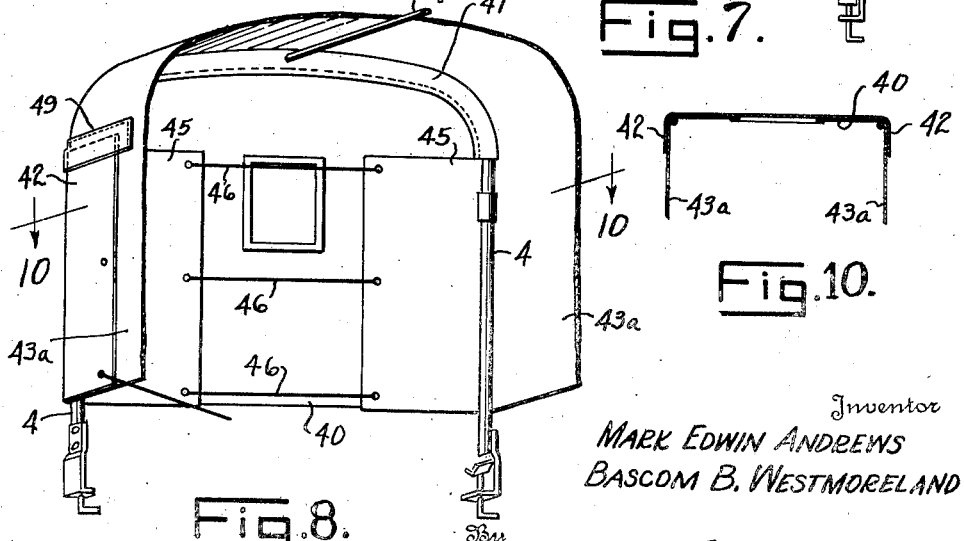
Inventor
MARK EDWIN ANDREWS
BASCOM B. WESTMORELAND
By E. V. Hardway
Attorney Patented Nov. 11, 1941

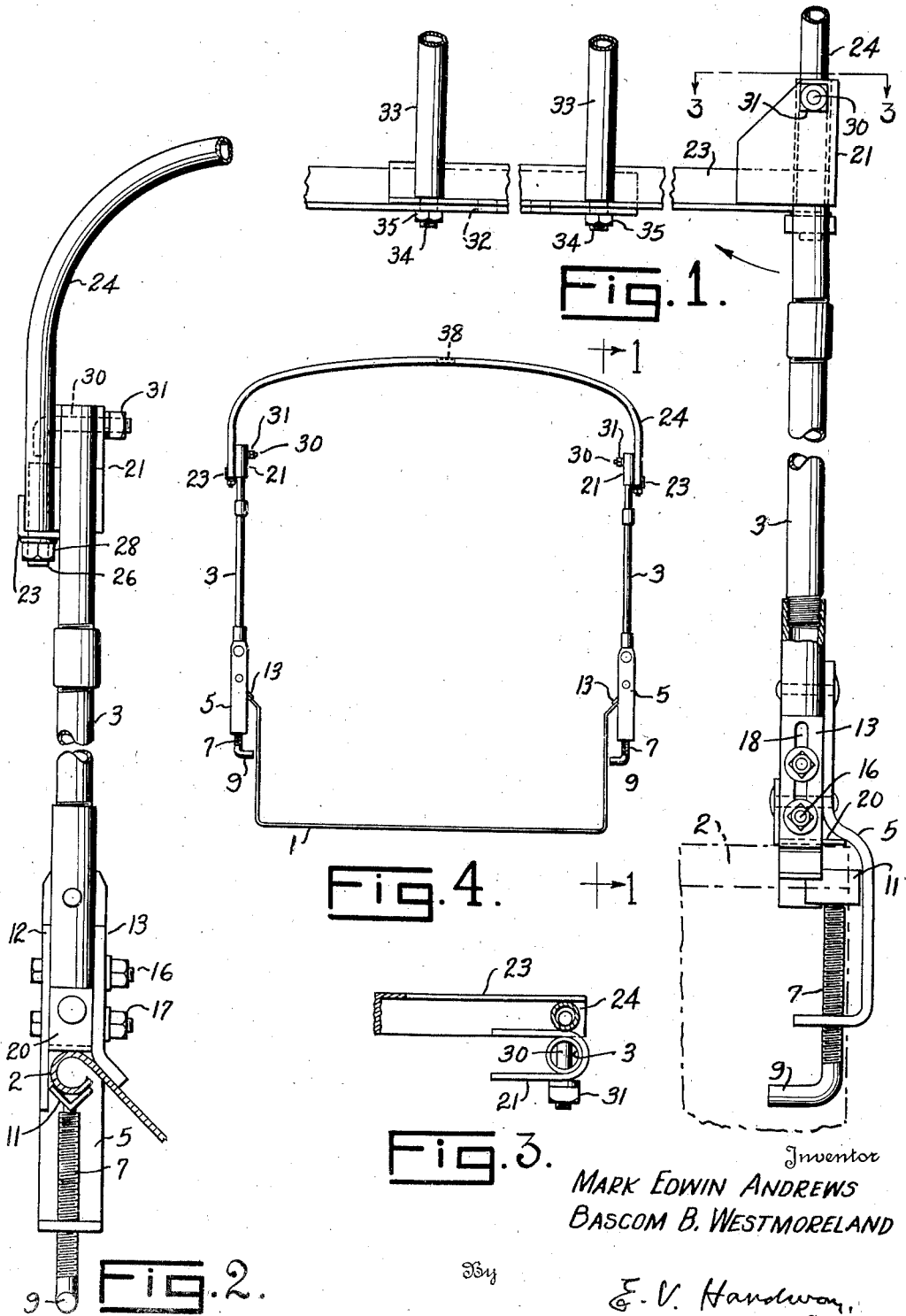

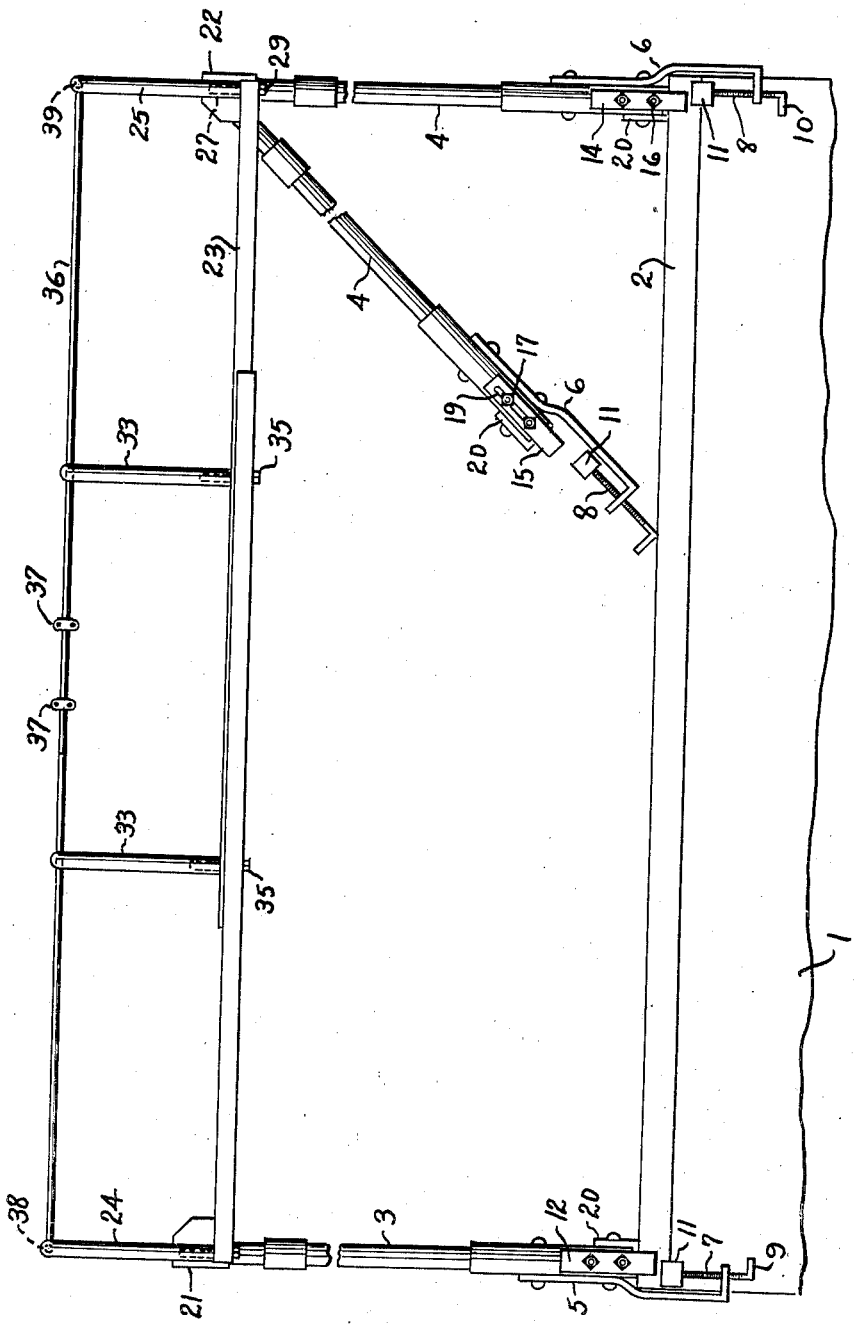

2,262,129

UNITED STATES PATENT OFFICE 2,262,129

VEHICLE BODY COVER

Mark Edwin Andrews and Bascom B. Westmoreland, Houston, Tex.

Application May 24, 1939, Serial No. 275,356

7 Claims. (Cl. 296—104)

This invention relates to a vehicle body cover.

An object of the invention is to provide a novel type of supporting frame adapted to be secured to a vehicle body and to support the top or covering for the body.

Another object of the invention is to provide a supporting frame for a vehicle body cover that is readily adjustable for length so that it may be accommodated to various bodies of any conventional length.

It is a further object of the invention to provide a supporting framework for a vehicle body top which may be readily dismounted from the body and collapsed into small space for convenience in storage or transportation.

Another object of the invention is to provide a novel type of top or covering which may be readily fitted to the supporting framework and of such construction as to be substantially weather proof, and also adjustable for length.

The invention also comprehends a novel combination of supporting framework and covering therefor which may all be readily dismounted from the body and collapsed into a compact unit.

With the above and other objects in view the invention has particular relation to certain novel features of construction, arrangement of parts and use, an example of which is given in this specification and illustrated in the accompanying drawings, wherein:

Figure 1 shows a fragmentary, side elevational view of one of the supporting posts showing the associated adjustable side rail and arched bows connected thereto taken on the line 1—1 of Figure 4.

Figure 2 shows a rear elevational view thereof.

Figure 3 shows a cross-sectional view taken on the line 3—3 of Figure 1.

Figure 4 shows an end elevational view of the supporting frame as mounted on a vehicle body.

Figure 5 shows a side elevational view thereof showing one of the supporting posts in partly collapsed position.

Figure 6 shows a fragmentary, plan view of the forward end of the top.

Figure 7 shows the forward end of the covering as viewed from the rear.

Figure 8 shows an inside, perspective view of the supporting frame and covering looking toward the front.

Figure 9 shows a front elevation, and

Figure 10 shows a fragmentary, horizontal, sectional view of the supporting framework and the covering, taken on the line 10—10 of Figure 8.

Referring now more particularly to the drawings wherein like numerals of reference designate the same parts in each of the figures, the numeral 1 designates a vehicle body of any conventional construction, the upper margins of whose sides are shown outwardly turned and terminating in the beads 2, 2 extending from end to end of the body. The supporting framework has the rear corner posts 3, 3 and the front corner posts 4, 4 formed of any suitable material but preferably of tubular metal. Secured to the rear sides of the posts 3, at their lower ends, are the brackets 5, 5 and secured to the forward sides of the posts 4, at their lower ends, are the brackets 6, 6. These brackets extend beneath the lower ends of their corresponding posts and the lower ends of the brackets are retracted, said ends of the brackets 5 being retracted forwardly and said ends of the brackets 6 being retracted rearwardly. Threaded upwardly through said corresponding retracted ends are the clamp screws 7, 7 and 8, 8, respectively, whose lower ends are overturned forming the handles 9, 9 and 10, 10 whereby said screws may be turned.

Mounted on the upper ends of the respective clamp screws 7, 8 and having a swiveling connection therewith, are the clamps 11 shaped to fit against the under sides of the corresponding beads 2 as shown more clearly in Figures 1 and 2.

Bolted to the lower ends of the rear posts 3 are the outer and inner straps 12, 13 and bolted to the outer and inner sides of the front posts 4 are the outer and inner straps 14, 15. These straps are secured to the respective posts by means of suitable bolts as 16 which pass through them and are firmly secured in place by the nuts as 17. The lower ends of the straps 12, 13, 14, 15 extend beneath the lower end of the corresponding posts. Said extended lower ends of the straps 12, 14 fit against the outer sides of the corresponding beads 2, as shown in Figure 2 and also in Figure 5 and the extended lower ends of the straps 13, 15 are inwardly turned to fit closely against the outwardly turned upper margins of the sides of the body as shown more accurately in Figures 1 and 2.

It may be noted from an inspection of Figures 1 and 5 that the straps 13, 15 have the vertical slots 18, 19 through which said bolts 16 pass and by reason of which said straps 13, 15 may be vertically adjusted so as to fit closely and firmly against the corresponding margins of the body as also shown in Figure 2. By an appropriate rotation of the clamp screws 7, 8 the corresponding clamps 11 may be screwed up tightly against the undersides of the beads 2 so as to clamp said beads firmly between said clamps 11 and the lower ends of the corresponding posts and said posts will be firmly braced against lateral movement by the reinforcing straps 12, 13, 14, 15.

It may be noted that the lower end of each tubular post is closed by an angle plate as 20 having the vertical wing secured to the inner side of the corresponding post and the horizontal wing which extends underneath the lower end of the post and lies directly on the corresponding bead 2 beneath thus forming a firm support for the post. The upper end of each rear post 3 extends through a U-shaped guide brace 21 and the upper end of each forward post 4 extends upwardly through a guide brace 22. The open sides of the braces 21 are directed forward, as shown in Figures 1 and 5 and the open sides of the braces 22 are directed rearwardly as also shown in Figure 5.

There are the side rails 23, 23 one on each side. There are the front and rear upwardly arched bows 24, 25 whose ends are fitted closely against, and preferably welded to, the outer wings, or sides of the corresponding guide braces 21, 22. As illustrated the side rails are formed of angle irons whose horizontal flanges extend inwardly. The lower ends of the bows 24, 25 have reduced extensions as 26, 27 which extend downwardly through corresponding bearings in the horizontal flanges of the side rails and are externally threaded to receive the clamp nuts 28, 29 for securing said side rails to the bows 24, 25 thus forming supports for the side rails.

The upper ends of the posts 3, 4 are pivoted in the corresponding guide brackets 21, 22 by means of the clamp bolts as 30 shown more accurately in Figure 2. The outer ends of these clamp bolts are inserted through aligned bearings in the corresponding ends of the tubular bows 24, 25 and are formed with downwardly turned clamp hooks. Their outer ends pass through aligned bearings in the side wings of the guide brackets 21, 22 and through bearings in the upper ends of the post and their inner ends are threaded to receive the retaining nuts 31, all of which is more accurately shown in Figures 2 and 3. Accordingly, when the lower ends of the posts are detached from the vehicle body, the rear legs may be swung forwardly and upwardly into parallel relationship with, and on the inside of, the corresponding side rails and the forward legs 4, 4 may be swung rearwardly and upwardly into parallel relationship with, and on the inside of, the corresponding side rails as indicated more accurately in Figure 5, said legs when being moved to folded, or collapsed, position being guided by their corresponding guide brackets 21, 22.

It is desirable that the top support be adjustable lengthwise for different lengths of vehicle bodies. Accordingly, the side rails 23 are made adjustable lengthwise by forming each side rail of sections whose adjacent ends overlap and are nested together as more accurately shown in Figures 1 and 5. Accordingly, their horizontal flanges overlie each other and are provided with a plurality of spaced bearings as 32, corresponding bearings of the respective rails being aligned transversely. There are a number of intermediate upwardly arched bows 33, there being preferably two of these intermediate bows. The bows 24, 25 and 33, 33 are of similar upwardly arched contour and are preferably, but not necessarily, formed of metallic tubing as shown. When the top support is adjusted to the desired length to accommodate it to the vehicle body on which it is to be mounted the corresponding bearings of the overlapping flanges of the side rails will be in alignment. The intermediate bows 33, 33 have the reduced end extensions 34, 34 which are fitted through said aligned bearings and which are externally threaded to receive the clamp nuts 35, 35, as shown more accurately in Figure 1. These clamp nuts when tightened up will not only hold the bows 33, 33 in proper position but will also secure the sections of the corresponding side rails together.

There is a central brace rod 36 extending from end to end of the top, as illustrated more accurately in Figure 5. This brace rod is also formed of sections whose ends overlap and are adjustably secured together by means of the releasable clamps 37, 37. The sections of the rod 35 are fitted through bearings in the tops of the intermediate bows 33, 33 as shown in Figure 5 and their rear and front ends extend through top bearings in the rear and front bows 25, 25 and are formed with overturned rear and front hooks as 38, 39 which engage said rear and front bows. Said upwardly arched bows whose lower ends are anchored as above stated and whose upper ends are braced by the brace rod 36, together with the side rails form a light, rigid, durable and adjustable structure for supporting the top of the cover which will usually be formed of canvas or other similar material.

The covering of the supporting framework will be preferably formed of fabric, such as canvas or other suitable flexible material. It is shown in Figures 6 to 10, inclusive. The numeral 40 designates, generally, the front end curtain of the cover which is approximately rectangular but which, at the top, conforms in shape to the front bow and is formed with a sleeve 41 through which the front bow passes. It is also formed with the lateral extensions or wings 42, 42 which are of rectangular shape as more clearly shown in Figure 7.

The top, and side curtains, are indicated generally by the numeral 43. The top portion thereof is supported on the bows and the side curtains 43a, 43a hang down on each side, as shown in Figure 8 forming the sides of the body cover. At the forward end the top and side curtains are separated by the slits 44, 44 thus providing the forward end flaps 45, 45. These flaps are drawn around the front posts 4, as shown in Figure 8 and their forward ends have the marginal eyes to receive the ends of the tying cords 46 whereby said flaps may be drawn taut and secured together. The forward end of the top proper is formed with a welt or sleeve 47 through which a pull cord 48 is passed and the free ends of this cord 48 are crossed in front and drawn taut and tied to the opposite legs 4 as shown in Figure 9. In fitting the forward end of the cover to the supporting frame, however, the upper margins of the wings 42 are fitted through the corresponding slits 44 and said wings are drawn rearwardly about the side curtains 43a as more clearly shown in Figure 8 and are suitably secured in that position.

Guard flaps 49, 49 are stitched along their upper margins and along their rear ends to the material of the covering, above and at the rear of the slits 44 as more clearly shown in Figures 6, 8 and 9 leaving their lower and front end margins free, said lower margins overlapping the upper ends of the corresponding wings 42 to prevent leakage.

If desired, in removing the framework and the top cover the fastenings of the wings 42 and the flaps 45 may be released and the free ends of the cord 48 released and the top portion 43 with its side curtains 43a and flaps 45 separately removed and the framework then collapsed and removed as hereinabove explained or the side curtains and the end curtains may be rolled up and the supporting framework released from the body and collapsed and the framework and covering removed and stored as a unit.

The drawings and description are illustrative merely, while the broad principle of the invention will be defined by the appended claims.

What we claim is

1. A top support for a vehicle body, comprising upstanding front and rear corner posts, a longitudinally adjustable side rail connecting the front and rear posts on each side, each side rail being formed of sections of angle iron whose adjacent ends are nested, means for releasably attaching the lower ends of the posts to the body and means for pivotally connecting the posts to the respective side rails whereby the posts, when released from the body, may be folded into parallel relation with the side rails.

2. A top support for a vehicle body, comprising front and rear corner posts, a side rail connecting the front and rear posts on each side, each rail being formed of longitudinally adjustable sections whose adjacent ends overlap, front, rear and intermediate bows whose ends are connected to the side rails, the ends of the intermediate bows extending through said overlapping ends of the side rails and forming means for connecting the rail sections together.

3. A top support for a vehicle body, comprising front and rear corner posts, a side rail connecting the front and rear posts on each side, each rail being formed of longitudinally adjustable sections formed of angle irons whose adjacent ends are nested together, front, rear and intermediate bows whose ends are connected to the side rails, the ends of the intermediate bows extending through the nested ends of the side rails and forming means for connecting the rail sections together and a top connecting rod connecting the bows together.

4. A supporting framework for the top covering of a vehicle body, comprising upstanding front and rear corner posts, means for releasably securing the lower ends of the posts to the corresponding parts of the body, U-shaped guide brackets to which the upper ends of the posts are pivoted, a side rail attached to the front and rear guide brackets on each side, said guide brackets being shaped to allow the front and rear posts, when detached from the body, to be swung only toward each other and into parallel relation with the rails, cover supporting, upwardly arched, bows whose ends are attached to the side rails.

5. A supporting framework for the top covering of a vehicle body, comprising upstanding front and rear corner posts, means for releasably securing the lower ends of the posts to the corresponding parts of the body, U-shaped guide brackets to which the upper ends of the posts are pivoted, a side rail attached to the front and rear guide brackets on each side, said guide brackets being shaped to allow the front and rear posts, when detached from the body, to be swung only toward each other and into parallel relation with the rails, cover supporting, upwardly arched, bows whose ends are attached to the side rails and a flexible top covering over and supported by the framework.

6. In a supporting framework for a top covering of a vehicle body an upstanding corner post, a U-shaped guide bracket within which the upper end of the post is pivoted, said bracket forming means for connecting the post to the side rail of the framework.

7. A supporting framework for a top covering of a vehicle body, comprising upstanding corner posts, front and rear guide brackets, a side rail attached to the front and rear guide brackets on each side, front and rear bows whose ends are attached to the side rails, clamp bolts fitted through aligned bearings in the corresponding ends of the bows and formed with downwardly turned clamp hooks, the other ends of said bolts fitting through aligned bearings in the brackets and in the upper ends of the posts and means on said other ends of said clamp hooks for preventing the detachment of the brackets therefrom.

MARK EDWIN ANDREWS.
BASCOM B. WESTMORELAND.